UNITED STATES PATENT OFFICE.

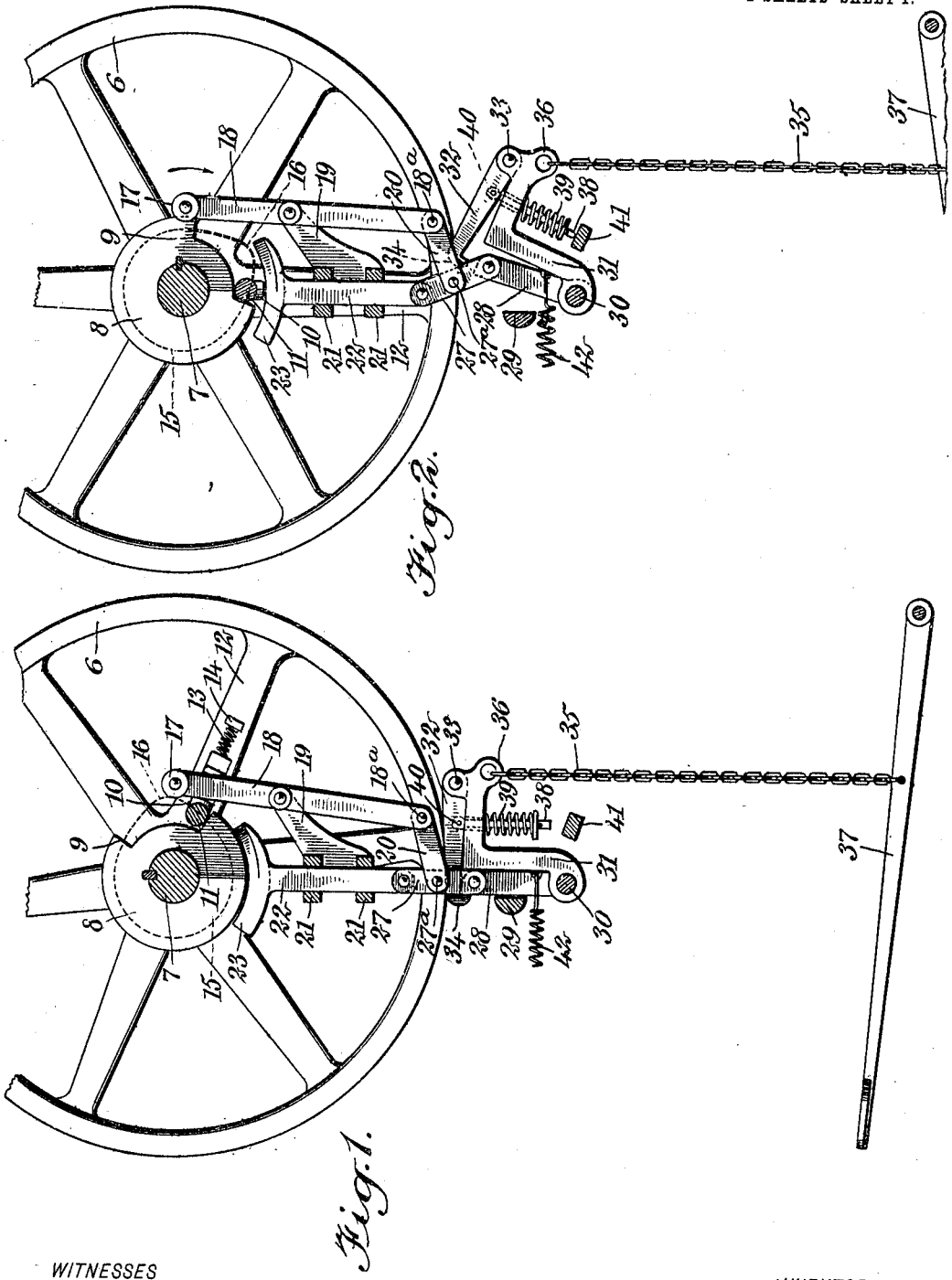

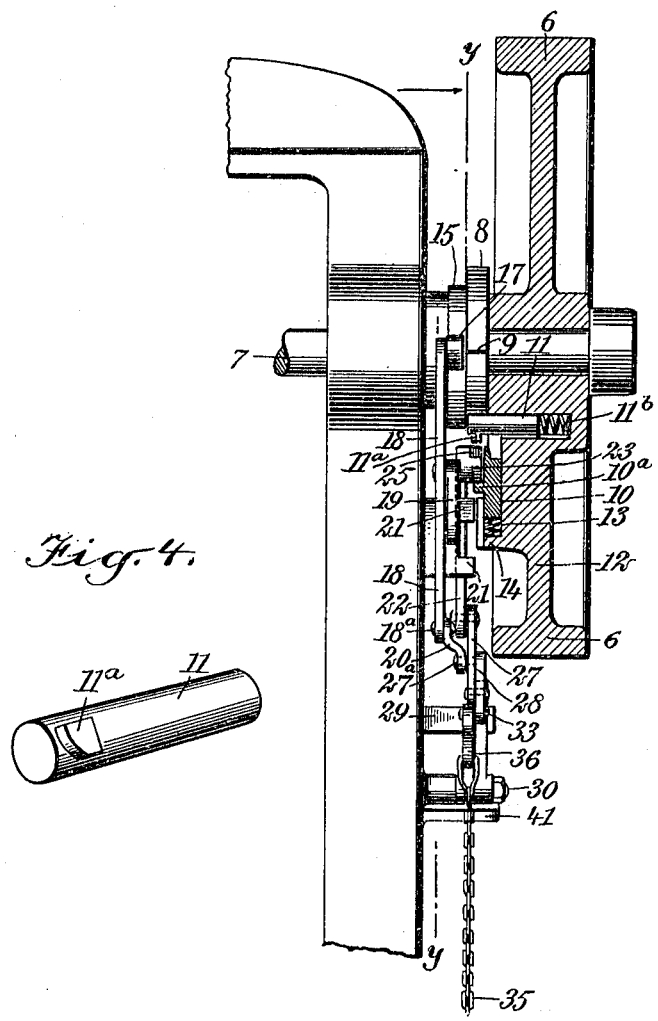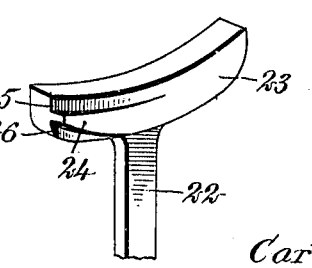

CARL OTTO BERGMAN, OF EVANSTON, ILLINOIS.

LATCH-CONTROLLING DEVICE FOR CLUTCH MECHANISMS.

978,351. Specification of Letters Patent. Patented Dec. 13, 1910.

Application filed February 21, 1908. Serial No. 417,123.

*To all whom it may concern:*

Be it known that I, CARL OTTO BERGMAN, a subject of the Kingdom of Sweden, and a resident of Evanston, in the county of Cook and State of Illinois, have invented a new and Improved Latch-Controlling Device for Clutch Mechanisms, of which the following is a full, clear, and exact description.

My invention relates to clutch mechanisms, such, for instance, as are employed upon punching and shearing machinery, my more particular object being to provide means for positively locking and unlocking a latch used for controlling the clutch pin or analogous member used for stopping and starting certain movable parts.

Reference is to be had to the accompanying drawings forming a part of this specification, in which similar characters of reference indicate corresponding parts in all the figures.

Figure 1 is a fragmentary section upon the line y—y of Fig. 3, looking in the direction of the arrow, and showing the clutch mechanism of a punching press, the latch for controlling the clutch pin, my improved mechanism for locking and unlocking this latch positively, and toggle mechanism controllable by a cam for actuating the locking mechanism, the parts in this view being shown as occupying their normal positions, the clutch being unlocked; Fig. 2 is a view similar to Fig. 1, but showing the toggle mechanism and parts associated therewith as occupying their abnormal position, so as to cause the clutch pin to grip the clutch members together in order that the machine may make a stroke; Fig. 3 is an enlarged fragmentary section taken substantially through the center of Fig. 1, and showing the clutch pin for gripping together the two clutch members, and also showing how the latch controls this clutch member; Fig. 4 is an enlarged perspective of the clutch pin provided with a boss to be engaged by the latch; and Fig. 5 is a fragmentary perspective of the latch.

The pulley 6 is mounted loosely upon the shaft 7 and is driven by power applied in any suitable manner to the peripheral surface of the pulley. A disk 8 is keyed upon the shaft 7 and is provided with a mutilation 9. A bolt 10 is provided with a boss 10ª projecting laterally therefrom. A clutch pin 11 is mounted in a spoke 12 of the pulley and is provided with a boss 11ª. A spring 11ᵇ (see Fig. 3) engages the clutch pin 11 and tends to press the same outwardly from the pulley. The bolt 10 is engaged by a spring 13 which normally tends to press it toward the center of the pulley. This spring 13 rests against a bead 14 carried by the spoke 12.

Mounted rigidly upon the shaft 7 is a cam 15 provided with a lobe 16. Disposed adjacent to this cam and partially within the path of the lobe 16 is a friction roller 17 journaled upon the upper end of a lever 18. This lever is journaled upon a bracket 19 and is connected with a link 20 by aid of a pivot pin 18ª.

Slidably journaled in bearings 21 is a stem 22 carrying a latch 23 of the form shown in Fig. 5. This latch 23 is provided with a rib 24 above and below which are grooves 25, 26. The stem 22 is journaled at its bottom to a link 27 which is connected with the link 20 by a pivot pin 27ª. Journaled upon the lower end of the link 27 is a link 28 which is adapted to engage a limiting stop 29. The link 28 is journaled at its lower end upon a stationary pin 30. A bell crank lever 31 is journaled upon this stationary pin, and a hook 32 is mounted upon a pivot pin 33 carried by the bell crank lever 31 and provided with a portion 34 for engaging the upper end of the link 28. A chain 35 is connected with the bell crank lever 31, the latter having an eye 36 for this purpose. A treadle 37 is secured to the lower end of the chain 35 for the purpose of drawing the same downwardly at the will of the operator. A pin 38 extends through the bell crank lever 31 and is secured to the hook 32 by aid of a joint 40. A spiral spring 39 encircles the pin 38 and continually exerts a tension against the bell crank lever 31. A stationary rod 41 mounted upon the framework is disposed within the path of the pin 38 so as to be engaged by this pin when the bell crank lever 31 moves into the position indicated in Fig. 2. A spiral spring 42 is secured to the bell crank lever 31 and normally tends to hold the same in the position indicated in Fig. 1.

The operation of my device is as follows: The parts being in normal position, as indicated in Fig. 1, power is applied to the pulley 6, for instance by aid of a belt, so as to turn this pulley in a clockwise direction, according to Fig. 1. The tension of the spring 42 now holds the bell crank lever 31 in its normal position, so that the portion 34 of the hook 32 engages the upper end of the link 28, and keeps this link in proper position to be drawn to the right by the hook 32, as hereinafter described. While the parts are in the position indicated in Fig. 1, the latch 23 is held normally in its uppermost position. The rotation of the pulley 6 now carries the clutch pin 11 around and as this clutch pin is mounted within the mutilation 9 the disk 8 is caused to turn a little distance. When, however, the clutch pin 11 arrives at the latch 23, the boss $11^a$ glides into the groove 25 (see Fig. 5) and this groove, being of gradually decreasing depth, acts as a cam surface and forces the clutch pin 11 back into the pulley so as to compress the spring $11^b$. The clutch pin 11 is thus unable to get any hold against the disk 8, and consequently the disk 8 and the shaft 7 are forced to stop. The shaft 7 can therefore make no movement whatever, so long as the latch 23 is thus rigidly locked in position. Suppose, now, that the operator desires that the shaft make a revolution, for the purpose of enabling the machine to make a punching or shearing stroke. For this purpose the operator depresses the treadle 37, causing the chain 35 to pull upon the bell crank lever 31 which, as above explained, is journaled upon the stationary pin 30. The hook 32 now pulls against the upper end of the lever 28 so as to turn the same slightly in a clockwise direction, this movement turning the link 27 slightly in a contraclockwise direction, and the instant this is accomplished the hook 32 disengages the link 28, all as will be understood from Fig. 2. The links 27, 28 together constitute a toggle joint, and this joint is bent by the pull of the hook 32, the hook being thereupon released. The result of this movement is that the link 20 presses the lower end of the lever 18 slightly outward, and consequently presses the friction roller 17 slightly toward the shaft 7. The bending of the toggle joint lowers the stem 22 and latch 23 so that this latch is now unable to obstruct the path of the boss $11^a$. Hence the clutch pin 11 protrudes as indicated in Fig. 3, and extends into the mutilation 9 (see Figs. 1 and 2). The rotation of the pulley 6 now causes the clutch pin 11 to turn the disk 8 and consequently the shaft 7. As soon, however, as one proximate revolution of the shaft is made, the lobe 16 of the cam 15 engages the friction roller 17 and turns the lever slightly in a clockwise direction, according to Fig. 2. This forces the toggle joint back into its normal position, as will be understood from Fig. 1, and causes the hook 32 to hold it normally in that position until the treadle is again depressed.

For the sake of clearness I have illustrated several parts of a punching press. I do not claim, however, all these parts as my invention. Essentially my improvement consists in the particular arrangement of the latch 23 and its connections, whereby this latch is locked and unlocked firmly and positively so as to cause the clutch to grip and release with precision. My invention further relates to the particular arrangement of the various links used in connection with the latch 23 for carrying out the general purpose above indicated.

I have noticed that in punching and shearing machinery, and particularly in punching presses, a large proportion of accidents resulting in the maiming of the hands of operators, are caused by the fact that the clutch pin or analogous member for connecting together the driving and driven clutch members, is not under perfect control of the latch used for actuating such clutch pin. This I seek to remedy by providing mechanism for locking the latch in such manner that it can not possibly allow the clutch pin to do anything except disconnect the clutch members if they happen at a particular moment to be connected, or to keep them disconnected in case they happen at some moment to be already disconnected.

Having thus described my invention, I claim as new and desire to secure by Letters Patent:

1. The combination of clutch mechanism, a latch for normally causing the same to release periodically, toggle mechanism for locking said latch mechanism, a lever for controlling said toggle mechanism, and a cam driven by power for actuating said lever, thereby restoring said latch to its normal position independently of the will of the operator.

2. A device of the character described, comprising clutch members, a clutch pin mounted upon one of said clutch members and adapted to engage the other clutch members for the purpose of locking said clutch members together, a latch for momentarily throwing said clutch pin out of action, means for moving said latch into and out of the path of travel of said clutch pin, and mechanism controllable automatically by the rotation of a shaft for positively locking said latch partially within the path of travel of said clutch pin.

In testimony whereof I have signed my name to this specification in the presence of two subscribing witnesses.

CARL OTTO BERGMAN.

Witnesses:
BERNHARD KRAATZ,
C. E. WARE.